(12) United States Patent
Neubert et al.

(10) Patent No.: US 7,558,753 B2
(45) Date of Patent: Jul. 7, 2009

(54) PRICE IMPROVEMENT CROSSING SYSTEM

(75) Inventors: David L. Cleary Neubert, London (GB); John Armstrong, London (GB)

(73) Assignee: Morgan Stanley, New York, NY (US)

( * ) Notice: Subject to any disclaimer, the term of this patent is extended or adjusted under 35 U.S.C. 154(b) by 753 days.

(21) Appl. No.: 09/870,325

(22) Filed: May 30, 2001

(65) Prior Publication Data

US 2002/0184136 A1 Dec. 5, 2002

(51) Int. Cl.
*G06Q 40/00* (2006.01)
(52) U.S. Cl. .......................................... 705/37; 705/35
(58) Field of Classification Search .................. 705/37, 705/35
See application file for complete search history.

(56) References Cited

U.S. PATENT DOCUMENTS

| | | | | |
|---|---|---|---|---|
| 5,689,652 | A * | 11/1997 | Lupien et al. | 705/37 |
| 6,098,051 | A | 8/2000 | Lupien et al. | 705/37 |
| 6,304,858 | B1 | 10/2001 | Mosler et al. | 705/37 |
| 7,035,819 | B1 * | 4/2006 | Gianakouros et al. | 705/37 |
| 2004/0143542 | A1 * | 7/2004 | Magill et al. | 705/37 |
| 2004/0153391 | A1 * | 8/2004 | Burns et al. | 705/37 |
| 2004/0153392 | A1 * | 8/2004 | West et al. | 705/37 |
| 2006/0190386 | A1 * | 8/2006 | Levy | 705/37 |
| 2006/0247997 | A1 * | 11/2006 | West et al. | 705/37 |
| 2006/0253380 | A1 * | 11/2006 | Adcock et al. | 705/37 |
| 2006/0259396 | A1 * | 11/2006 | Burns et al. | 705/37 |
| 2007/0055607 | A1 * | 3/2007 | Wunsch et al. | 705/37 |
| 2007/0174176 | A1 * | 7/2007 | Brucato | 705/37 |
| 2008/0086401 | A1 * | 4/2008 | Mather | 705/35 |
| 2008/0172318 | A1 * | 7/2008 | Brucato et al. | 705/37 |
| 2008/0172319 | A1 * | 7/2008 | Brucato et al. | 705/37 |
| 2009/0006266 | A1 * | 1/2009 | Hanson et al. | 705/80 |

FOREIGN PATENT DOCUMENTS

JP 2000-148850 5/2000

OTHER PUBLICATIONS

Communication issued by the European Patent Office on Dec. 3, 2004 for application No. 02741791.4-1238.
Int'l Search Report dated Feb. 10, 2003 for PCT/US02/17290.

* cited by examiner

*Primary Examiner*—Narayanswamy Subramanian
(74) *Attorney, Agent, or Firm*—Isabel Cantallops; Baker & Hostetler LLP (57) ABSTRACT

A method provided for matching a buy order having a buy order price and a sell order having a sell order price that includes the step of determining if the buy order price is not less than the sell order price. Next, an NBBO price range is identified and it is determined whether the buy order price and the sell order price are within the NBBO range. A midpoint between the buy order price and the sell order price is then calculated. Finally, the buy order and the sell order is matched at the midpoint if the buy order price is not less than the sell order price and the buy order price and the sell order price are within the NBBO range.

31 Claims, 3 Drawing Sheets

PRICE IMPROVEMENT CROSSING SYSTEM

BACKGROUND

The following invention relates to a system and method for matching buy and sell orders in securities and, in particular, to a system and method of improving the speed and price at which such securities transactions take place while maintaining the confidentiality of any given buy and sell order.

Buyers and sellers of securities have many avenues through which to trade. Depending on the type of security, a trade between a buyer and seller may occur on one of several markets including the New York Stock Exchange ("NYSE"), the American Stock Exchange ("AMEX"), the National Association of Securities Dealers Automated Quotations system ("NASDAQ") or via any number of ATSs, including electronic communications networks ("ECNs"), that match buyers and sellers. Buyers and sellers generally present their orders for execution on one of these markets through a broker associated with a financial institution that communicates directly with the markets. Thus, financial institutions act as an interface between customers desiring to trade in a particular security and the financial markets in which the trade will be executed.

In addition to servicing order flow on behalf of its customers, a financial institution may also trade in the financial markets on its own behalf, for example, by engaging in program trading or trading to manage the financial institution's overall risk. Orders placed on behalf of the financial institution's proprietary accounts are also forwarded to the financial markets for execution.

Although access to the financial markets is vital for a financial institution to service its customer and proprietary order flows, sole reliance on the financial markets for order execution is sometimes inefficient. First, financial institutions incur a fee for each transaction executed in the financial markets on its behalf. In many cases, however, the financial institution will pay this transaction fee even though it controls both the seller's and buyer's orders in a particular transaction. In such a case, the financial institution could have eliminated the fees associated with such a transaction by not using the financial markets to execute the transaction and matching the buyer and seller internally. Aside from unnecessary transaction costs, routing orders externally for execution often results in slower execution times as opposed to orders that are matched within the financial institution itself.

Customers often place various restrictions on orders placed with a financial institution. For example, if an order to transact in a security at a particular price is designated by a customer as a "held" order, then the trader receiving the order is subject to certain obligations with respect to executing such an order. There are two types of held orders. With a held market order, the trader is obligated to buy/sell the particular security at the prevailing market price as quickly as possible. With a held limit order, the trader is obligated to attempt to buy/sell the security at the limit price or better. In contrast, if the customer designated the order as a "not held" limit order, then the trader may buy/sell the security at the limit price or better, and within a time period subject to the trader's discretion.

A financial institution is obligated to seek the best execution for a particular customer order. To meet its obligation, the financial institution is generally not limited as to the forum in which it may transact and generally routes the order to any of a number of external markets in order to get the best execution price.

In contrast, orders may have restrictions with respect to what forum the financial institution may use to transact. For example, if an order is designated by a customer as a "cross only" order, then the financial institution cannot route these orders to external financial markets for execution and must instead attempt to execute the trade using another customer of the financial institution as a counterparty. If an order is designated as a "do not represent" order, then the financial institution cannot show interest to potential counterparties. A customer may designate an order as "cross only" and "do not represent" so that the customer's intentions to transact in the security do not affect the market for the particular security. In this way, customers can have their orders executed by the financial institution while still maintaining confidentiality.

Customers placing "cross only" and "do not represent" orders, however, have to weigh the benefits of maintaining order confidentiality against execution price and speed. Because the financial institution cannot present "cross only" and "do not represent" orders to the public markets, these orders may not be executed as quickly or at as good a price as orders exposed to external markets.

Prior art systems exist for matching buy and sell orders in a particular security. These systems, also called crossing networks, match buyers and sellers using any of a number of algorithms. For example, POSIT, a crossing network owned by ITG, Inc., matches buyers and sellers at the midpoint of the prevailing national best bid and offer (the "NBBO") in NASDAQ or CQS. For example, if the POSIT system has a buyer desiring to buy XYZ Corp. stock at a limit of $25 a share and a seller wishing to sell XYZ Corp. shares at a limit of $20, then POSIT will execute a transaction between the buyer and seller at a price which is the midpoint of NBBO. Therefore, if NBBO is $23 bid by $25 offer, then the midpoint of NBBO is $24 and the match between the buyer and seller occurs at $24. If, however, NBBO is $22 bid by $24 offer, then the midpoint of NBBO is $23 and the match between the buyer and seller is at $23. If, however, the midpoint of NBBO is $26, then the POSIT system will not execute a trade between the buyer and seller. Thus, because the POSIT matching algorithm only executes trades at the midpoint of NBBO, it does not necessarily provide an opportunity to trade even if buyer and seller would otherwise match.

Another prior art strategy used to match buyers and sellers, one that is used by several ECNs, is to trade at the bid/offer price of the first counterparty to post an order to buy/sell a particular stock to the ECN. For example, if a buyer posts a bid to buy XYZ Corp. shares at $25 per share and subsequently a seller posts an offer to sell those shares for $22 each, then the transaction favors the seller and occurs at $25. Conversely, if a seller posts an offer to sell XYZ Corp. shares at $22 per share and subsequently a buyer posts a bid to buy those shares for $25 each, then the transaction favors the buyer and occurs at $22. Thus, under this algorithm, the second party to a transaction is favored to the detriment of the first party.

Yet another prior art strategy for matching buyers and sellers exists in which trades in a particular security between buyers and sellers occur at the NYSE closing price for the security. This approach, used in the Instinet's aftermarket system, does not offer a price improvement to either buyer or seller.

Accordingly, it is desirable to provide a method and system that improves the execution speed and price at which customer buy and sell orders transact while maintaining the confidentiality of any designated order.

SUMMARY OF THE INVENTION

The present invention is directed to overcoming the drawbacks of the prior art. Under the present invention, a method is provided for matching a buy order having a buy order price and a sell order having a sell order price. The method includes the step of identifying an NBBO price range and determining whether the buy order price and the sell order price are within the NBBO range. Next, it is determined whether the buy order price is not less than the sell order price. A midpoint between the buy order price and the sell order price is then calculated. Finally, the buy order and the sell order are matched at the midpoint of the buy order price and the sell order price if the buy order price is not less than the sell order price and the buy order price and the sell order price are within the NBBO range. Thus, a transaction occurs at a price at which both the buyer and seller may receive a price improvement over their original buy order price and sell order price, respectively.

In an exemplary embodiment, where the NBBO range includes a best offer price and a best bid price, and where the buy order price is above the best offer price and the sell order price is within the NBBO range, the method of the present invention includes the step of changing the buy order price to a changed buy order price that is equal to the best offer price. Next, a midpoint between the changed buy order price and the sell order price is calculated. Finally, the buy order and the sell order are matched at the midpoint if the changed buy order price is not less than the sell order price.

If the sell order price is below the best bid price and the buy order price is within the NBBO range, the method includes the step of changing the sell order price to a changed sell order price that is equal to the best bid price. Next, a midpoint between the changed sell order price and the buy order price is calculated. Finally, the buy order and the sell order are matched at the midpoint if the buy order price is not less than the changed sell order price.

If the buy order price is above the NBBO offer or the sell order is below the NBBO bid, the method includes the step of changing the buy order price to a changed buy order price that is equal to the best offer price and changing the sell order price to a changed sell order price that is equal to the best bid price. Next, a midpoint between the changed buy order price and the changed sell order price is calculated. Finally, the buy order and the sell order are matched at the midpoint.

In another exemplary embodiment, the buy order is for a first share amount and the sell order is for a second share amount and the step of matching the buy order and the sell order includes the step of matching the buy order and the sell order up to the first share amount if the first share amount is less than the second share amount and matching the buy order and the sell order up to the second share amount if the second share amount is less than the first share amount.

In yet another exemplary embodiment, a second buy order having a second buy order price above the midpoint and less than the buy order price is included and the step of matching the buy order and the sell order includes the steps of calculating a cross point equal to the second buy order price plus an increment and matching the buy order and the sell order at the cross point.

In still yet another exemplary embodiment, the buy order is selected from a plurality of buy orders each having a buy order price and the buy order price of the buy order is greater than the buy order price of any other of the plurality of buy orders.

In another exemplary embodiment, a second buy order having a second buy order price equal to said buy order price of the buy order is included and the buy order is an agency order and the second buy order is a proprietary order.

In yet another exemplary embodiment, the second buy order price equals the buy order price of the buy order, the buy order and the second buy order are either both agency orders or proprietary orders and the buy order has an order time and the second buy order has a second order time such that the order time is prior to the second order time.

In an exemplary embodiment of the present invention, a crossing network for matching the buy order and the sell order is included and receives a plurality of pass-through orders and a plurality of passive orders wherein the buy order and the sell order are included in the group of the plurality of pass-through orders and the plurality of passive orders. Thus, because order flow through the crossing network is increased as a result of the passive and pass-through orders entering the crossing network, the execution speed for both passive and pass-through orders are increased while still maintaining the confidentiality of the passive orders.

In another exemplary embodiment, an order router is included and is in communication with the crossing network. The order router is in communication with at least one external order destination and receives at least a portion of the pass-through orders from the crossing network and forwards the at least a portion of the pass-through orders to the at least one external order destination. In yet another embodiment, the at least a portion of the pass-through orders includes orders that have not been matched by the crossing network. Thus, those pass-through orders that are not matched by the crossing network are forwarded to an external order destination, for example, the NYSE or an ECN, for execution.

Accordingly, a method and system is provided that offers overall improvement in the execution price and speed at which buy and sell orders transact while maintaining the confidentiality of any designated order.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 1:
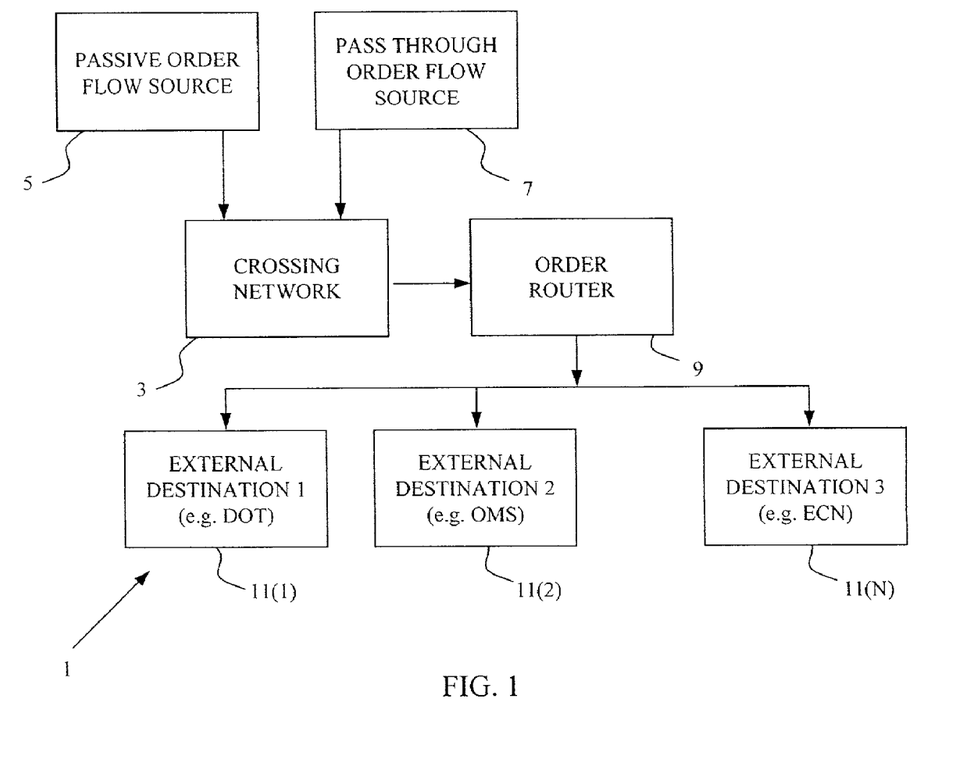
FIG. 1 is a block diagram of a system for improving the execution price and speed of transactions in accordance with the present invention.

Referring now to FIG. 1, there is shown a block diagram of a system 1 for improving the execution price and speed of transactions in accordance with the present invention. System 1 includes a crossing network 3 that receives an order flow of securities such as, by way of example, equity securities, and matches buy and sell orders contained in the order flow.

Crossing network 3 typically consists of software executing on a computer that electronically receives the order flow and determines which of the orders contained therein are suitable for matching. Once orders that are suitable for matching are identified, crossing network 3 executes a trade between them using known techniques.

Crossing network 3 receives buy and sell orders from a passive order flow source 5 and a pass-through order flow source 7. Passive order flow source 5 includes orders that are designated as "not held," "cross only" and "do not represent" orders thereby indicating that these orders are to be kept confidential. If crossing network 3 is operated by a financial institution, then passive order flow source 5 may include orders from customers that the financial institution is required to keep confidential even from traders and salespersons within the financial institution. Passive order flow source 5 may also include proprietary orders (i.e., orders on behalf of the financial institution) that the financial institution does not want to route externally. Pass-through order flow source 7 may include customer orders that were not designated as confidential as well as unrestricted proprietary orders for which the best execution price is desired. Upon receiving the buy and sell orders from passive order flow source 5 and passthrough order flow source 7, crossing network 3 attempts to match the buy orders and sell orders according to the matching procedure described below.

Orders (or residual portions of orders) that originated from pass-through order flow source 7 that are not immediately matched by crossing network 3 are typically forwarded to order router 9. Order router 9 routes the orders to any of a plurality of external destinations 11 for execution. Examples of external destinations 11 include DOT (used to communicate with the NYSE), other exchanges (such as the Pacific Exchange or the AMEX), order management systems operated by other financial institutions, ECNs (such as Island and Instinet) and ATSs (such as POSIT). Order router 9 typically consists of software executing on a computer, designed using techniques well-known in the art, that receives non-matched, pass-through orders from crossing network 3 and determines to which of external destinations 11 such orders should be routed.

In an exemplary embodiment, orders from pass-through flow source 7 that are not immediately matched remain in crossing network 3 for a period of time during which a match may be found. The period of time such orders may remain in crossing network 3 may be selected by the entity placing the order and may range from fractions of a second to any length of time desired. If the specified time period has elapsed and no match for the order is found, the order is routed to order router 9 for execution on any of external destinations 11.

Orders that originated from passive order flow source 5 may remain in crossing network 3 until a suitable match is found. Alternatively, such orders may be cancelled after a period of time has elapsed and no match has been found by crossing network 3. The decision as to whether a passive order remains in crossing network 3 awaiting a match or whether such order is cancelled may be based on any suitable criteria including, but not limited to, the instructions of the entity or individual placing the order.

Because in system 1 the orders from passive order flow source 5 and the orders from pass-through order flow source 7 are both sent to crossing network 3, the total order flow entering crossing network 3 is substantially greater than if only passive orders or pass-through orders alone were sent to crossing network 3. As a result of the increased order flow exposure, the likelihood that, and the rate at which, any of the orders from passive order flow source 5 and pass-through order flow source 7 are matched by crossing network 3 is greatly increased. In addition, because passive orders are not routed to external destinations 11, the confidentiality of such passive orders is maintained.

Furthermore, because orders from passive order flow source 5 are typically designated as "cross only" and "do not represent" orders, these orders must also be kept confidential even while they remain in crossing network 3 awaiting a match. To achieve this level of confidentiality, these orders are designated as "blind" orders which prevents any trader, salesperson, customer or other order handler associated with the financial institution from being able to view such orders while they are in crossing network 3. Thus, a trader can only view the trader's own orders from passive order flow source 5. In this way, the financial institution's confidentiality obligations are met while increasing the total order flow entering through crossing network 3. Furthermore, by designating orders from passive order flow source 5 as "blind" orders, entities that desire their orders to remain secret are more willing to place such orders with a financial institution that employs system 1 thereby causing even a further increase in order flow into crossing network 3.

Accordingly, system 1 increases the speed at which orders are executed while maintaining the confidentiality of any designated orders.

In addition to increasing the execution speed of orders, system 1 also improves the price buyers and sellers receive for orders that are matched by crossing network 3. First, price improvement is achieved because the increased order flow into crossing network 3 results in better executions (i.e., lower price for buyer, higher price for seller). In addition, crossing network 3 matches buy and sell orders using a matching algorithm of the present invention that provides both buyers and sellers with price improvement.

Figure 2:
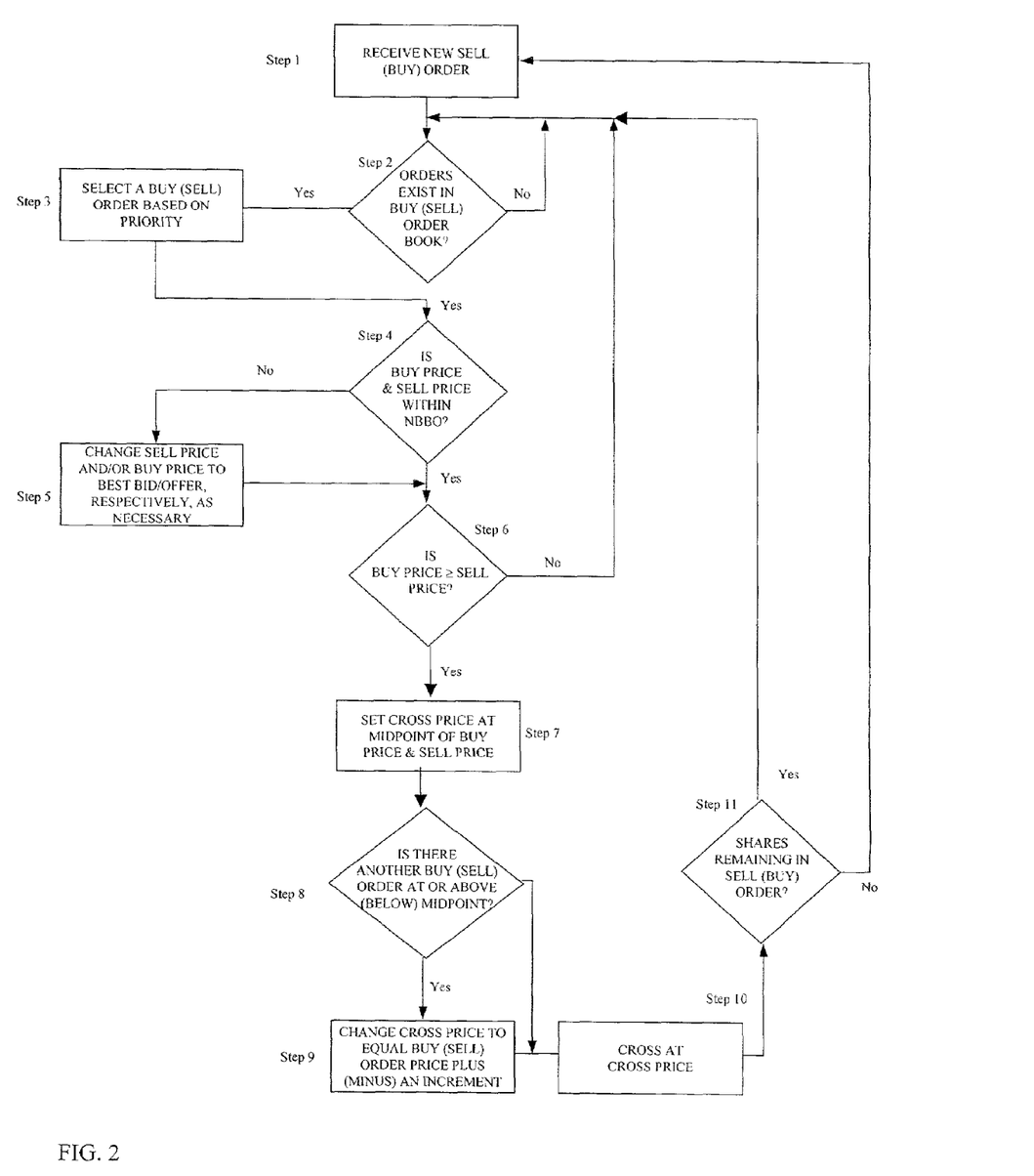
FIG. 2 is a flowchart of a price improvement matching algorithm included in the system of FIG. 1.

Referring now to FIG. 2, there is shown a flowchart of the price improvement matching algorithm of the present invention that provides both buyers and sellers with price improvement on trades matched by crossing network 3. Initially, the method starts at Step 1 in which a new sell (buy) order is received by crossing network 3. Next, in Step 2, it is determined whether any buy (sell) orders exist in crossing network 3 with which the new sell (buy) order may be matched. If no buy (sell) orders are in crossing network 3, the method continuously loops until a suitable buy (sell) order is received.

When crossing network 3 contains buy (sell) orders, in Step 3, one of the buy (sell) orders is selected as a potential match for the new sell (buy) order according to a selection priority scheme. Initially, the buy (sell) order having the highest (lowest) buy (sell) order price is selected for transacting with the new sell (buy) order. If there are two buy (sell) orders that have the same buy (sell) order price, then priority is given to an agency order, i.e., an order a financial institution receives from a customer. If both orders are agency orders or both orders are proprietary orders then priority is given to the order that was first in time. In addition to the above priority scheme, it will be obvious to one of ordinary skill to use additional or different criteria for selecting a buy (sell) order to match with the new sell (buy) order.

Next, in Step 4, it is determined whether the buy order price and the sell order price are within the current NBBO range. If it is determined that the buy order price is greater than the national best offer price, then, in Step 5, the buy order price is reduced to the national best offer price. Similarly, if the sell order price of the new sell order is less than the national best bid price, then, in Step 5, the sell order price is increased to the national best bid price. By adjusting the sell order price and the buy order price in such a manner, matches performed by crossing network 3 will not result in buyers paying more than the national best offer or sellers receiving less than the national best bid. Accordingly, buyers and sellers are guaranteed to receive a price that falls within the NBBO.

Next, in Step 6, it is determined if the buy order price of the selected buy order is greater than or equal to the sell order price of the new sell order. If the buy order price is in fact less than the sell order price, then the selected buy order is not a suitable match for the new sell order and the method returns to Step 2 in which another buy (sell) order is selected for matching the new sell (buy) order. If, however, the buy order price is greater than or equal to the sell order price, then the method proceeds to Step 7 in which a cross point is set at the midpoint between the buy order price and the sell order price. By setting the cross point to the midpoint of the buy order price and the sell order price, both the buyer and seller receive a price improvement over the original price of their orders.

Before crossing network 3 matches the buy order and sell order at the cross point, the method, in Step 8, determines whether there is another buy (sell) order in crossing network 3 having a buy (sell) order price at or above (below) the midpoint calculated in Step 7. If there is more than one buy (sell) order in crossing network 3 having a buy (sell) order price at or above (below) the midpoint, then buy (sell) order that is the next highest (lowest) to the selected buy (sell) order is identified. If such another buy (sell) order exists, then, in Step 9, the cross point at which the buy (sell) order and the new sell (buy) order will trade is changed to the buy (sell) order price of the another buy (sell) order plus (minus) an increment. The increment may be any amount and will typically depend on the particular market and regulations governing such market. For example, a suitable increment may be 1 tick which for New York Stock Exchange traded equities is one cent. In certain markets, regulations do not require the addition (subtraction) of an increment. In these cases, the cross point at which the buy (sell) order and the new sell (buy) order will trade is simply changed to the buy (sell) order price of the another buy (sell) order.

Once the cross point is determined, a transaction between the buy (sell) order and the new sell (buy) order is performed by crossing network 3, as in Step 10. The transaction between the buy (sell) order and the new sell (buy) order will be for a number of shares that is the lesser of the number of shares included in the buy (sell) order and the new sell (buy) order. If there are more shares in the new sell (buy) order than in the buy (sell) order against which the new sell (buy) order was crossed, as is determined in Step 11, then the method returns to Step 2 so that another suitable buy (sell) order may be selected to match against the remaining shares of the new sell (buy) order. If, however, all the shares of the sell (buy) order have been matched in Step 10, then the method returns to Step 1 in which another new sell (buy) order to be matched is received by crossing network 3.

To illustrate the price improvement selection method of the present invention assume that the national best bid is $50.00 and the national best offer is $51.00. If crossing network 3 receives a sell order having a sell order price of $50.10 and a buy order having a buy order price of $50.20, then crossing network will cross the buy order and sell order at the midpoint between the buy order price and the sell order price—in this case at $50.15. Thus, both the buyer and seller receive as price improvement a portion of the spread between the buy order price and the sell order price.

If the buy order price is $52.00 and the sell order price 50.90, because the buy order price is outside the NBBO range, the buy order price is changed to the national best offer price of $51.00. Once the change is made, crossing network 3 will cross the buy order and sell order at the midpoint between the changed buy order price and the sell order price—in this case $50.95. Similarly, if the sell order price is $49.50, the sell order price is changed to $50.00, the national best bid price, and the cross between the buy order and sell order occurs at $50.50.

If crossing network 3 receives a sell order having a sell order price of $50.00 and also receives two buy orders, a first of which having a buy order price of $50.20 and the second of which having a buy order price of $50.15, then according to the priority scheme used by crossing network 3, the buy order having the higher buy order price—$50.20—will be matched against the $50.00 sell order. As before, a cross point for matching the first buy order and sell order is calculated as the midpoint between the first buy order price and the sell order price—i.e. $50.10. In this case, however, the second buy order has a buy order price at the calculated cross point of $50.15 so the cross point at which the sell order and the first buy order are crossed is changed to $50.15 plus an increment, or $50.16.

If the first buy order received by crossing network 3 was a proprietary order having a buy order price of $50.20 and the second buy order received was an agency order having the same buy order price of $50.20, then according to the priority scheme used by crossing network 3, the agency buy order takes precedence over the proprietary buy order and is matched against the sell order at the midpoint of $50.10. If, on the other hand, both of the buy orders were either agency orders or proprietary orders, then the first buy order, being first in time, is matched against the sell order at the $50.10 midpoint.

Figure 3:
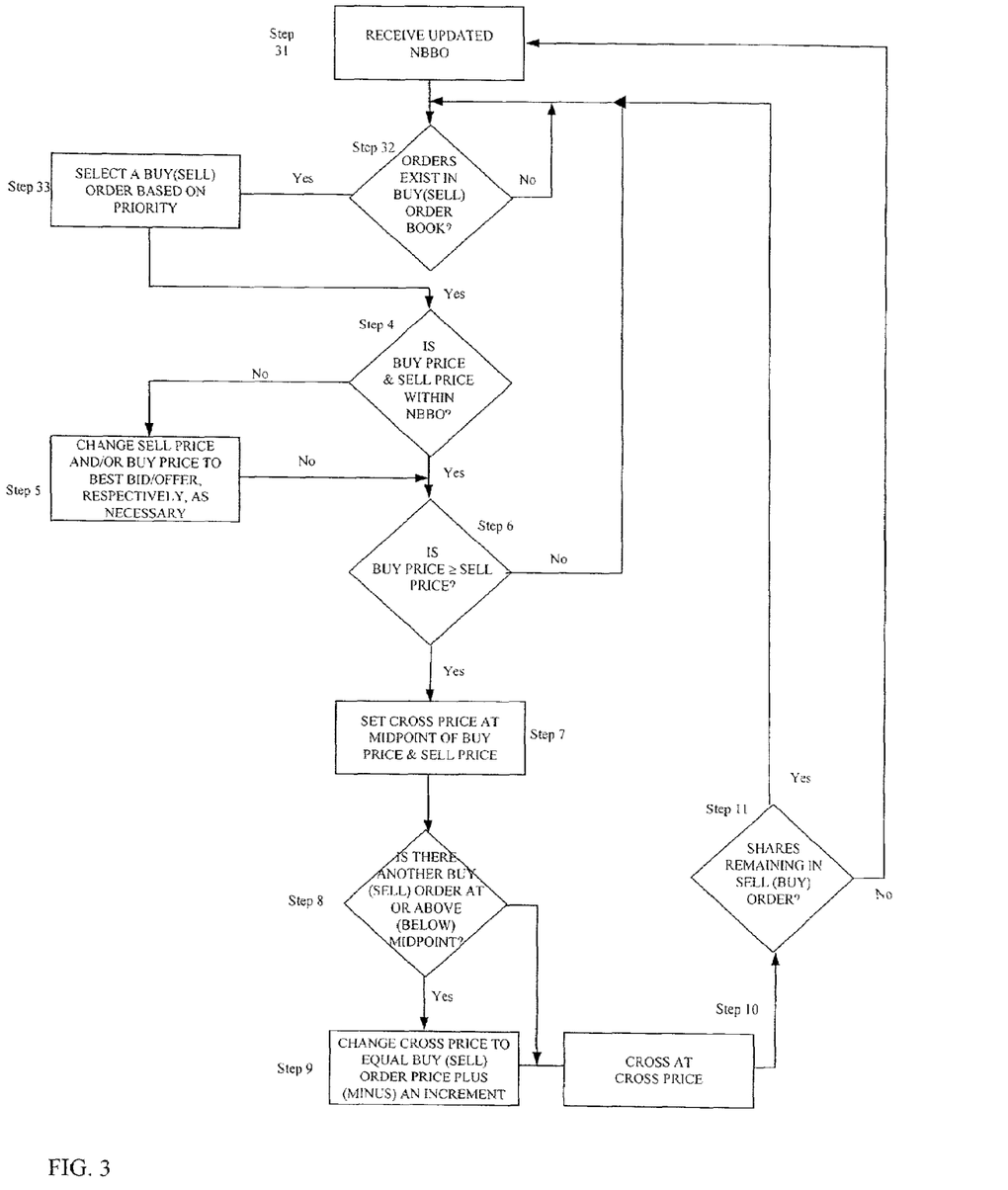
FIG. 3 is a flowchart of a price improvement matching algorithm included in the system of FIG. 1 according to an exemplary embodiment.

Referring now to FIG. 3, there is shown a flowchart of the price improvement matching algorithm according to an exemplary embodiment of the present invention. Elements that are similar to elements of the flowchart of FIG. 2 are similarly labeled and a detailed description thereof is eliminated.

Whenever the NBBO changes, buy and sell orders contained in crossing network 3 must be reevaluated to determine whether suitable matches exist. Thus, the method starts at Step 31 in which an update to the NBBO is received. Next, in Step 32, it is determined whether buy orders and sell orders exist in the buy order book and sell order book, respectively, for matching by crossing network 3. If both buy orders and sell orders are not present, then the method continuously loops until both buy orders and sell orders are available. If buy orders and sell orders are both available for matching, then, in Step 33, a buy order and a sell order are selected for matching according to the selection priority scheme described above. Once a buy order and sell order are selected, the method continues on to Step 4 to determine whether a trade between the buy order and sell order is feasible in a manner similar to that described with respect to the flowchart of FIG. 2. Thus, crossing network 3 examines existing orders for potential trades based on changes in the NBBO as well as based on new orders being received by crossing network 3.

The flowcharts of FIGS. 2 and 3 describe a price improvement matching algorithm according to exemplary embodiments. Crossing network 3 may also be configured to match buy and sell orders using any other desirable matching algorithm. Furthermore, it will be obvious to one of ordinary skill based on the above to include in crossing network 3 other suitable price improvement matching algorithms.

Accordingly, a system and method is provided in which buy orders and sell orders transact at increased execution speeds while offering overall improvement in the execution price each order receives and maintaining the confidentiality of any designated order. Because in system 1 of the present invention both passive orders and pass-through orders are combined, the total order flow entering crossing network 3 is substantially greater thereby increasing the likelihood that, and the rate at which, orders are matched by crossing network 3. Also, because passive orders are not routed to external destinations 11, the confidentiality of such passive orders is maintained. In addition to increasing the execution speed of orders, the increased order flow through crossing network 3 may also improve the execution price buyers and sellers receive. Furthermore, execution price may be improved as a result of the matching algorithm employed by crossing network 3 in which the spread between the buyer's buy order price and the seller's sell order price is divided to provide both the buyer and seller with price improvement.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computer-implemented method for matching a buy order having a buy order price and a sell order having a sell order price with a system comprising one or more computer processors, said method comprising the steps of:
   identifying with one of said computer processors an NBBO price range, said NBBO price range having a best offer price and a best bid price;
   determining with one of said computer processors if said buy order price and said sell order price are within said NBBO price range;
   determining with one of said computer processors if said buy order price is not less than said sell order price;
   wherein when said buy order price is not within said NBBO price range and said sell order price is within said NBBO price range, said method further comprising the steps of:
      changing with one of said computer processors said buy order price to a changed buy order price that is equal to said best offer price;
      calculating with one of said computer processors a midpoint between said changed buy order price and said sell order price; and
      matching with one of said computer processors said buy order and said sell order at said midpoint.

2. A computer-implemented method for matching a buy order having a buy order price and a sell order having a sell order price with a system comprising one or more computer processors, said method comprising the steps of:
   identifying with one of said computer processors an NBBO price range, said NBBO price range having a best offer price and a best bid price;
   determining with one of said computer processors if said buy order price and said sell order price are within said NBBO price range;
   determining with one of said computer processors if said buy order price is not less than said sell order price;
   wherein when said sell order price is not within said NBBO price range and said buy order price is within said NBBO price range, said method further comprising the steps of:
      changing with one of said computer processors said sell order price to a changed sell order price that is equal to said best bid price;
      calculating with one of said computer processors a midpoint between said changed sell order price and said buy order price; and
      matching with one of said computer processors said buy order and said sell order at said midpoint.

3. A computer-implemented method for matching a buy order having a buy order price and a sell order having a sell order price with a system comprising one or more computer processors, said method comprising the steps of:
   identifying with one of said computer processors an NBBO price range, said NBBO price range having a best offer price and a best bid price;
   determining with one of said computer processors if said buy order price and said sell order price are within said NBBO price range;
   determining with one of said computer processors if said buy order price is not less than said sell order price;
   wherein when said buy order price and said sell order price are not within said NBBO price range, said method further comprising the steps of:
      changing with one of said computer processors said buy order price to a changed buy order price that is equal to said best offer price;
      changing with one of said computer processors said sell order price to a changed sell order price that is equal to said best bid price;
      calculating with one of said computer processors a midpoint between said changed buy order price and said changed sell order price; and
      matching with one of said computer processors said buy order and said sell order at said midpoint.

4. The method of claims 1-3, wherein said buy order is for a first share amount and said sell order is for a second share amount and wherein the step of matching said buy order and said sell order includes the steps of:
   matching said buy order and said sell order up to said first share amount if said first share amount is less than said second share amount; and
   only matching said buy order and said sell order up to said second share amount if said second share amount is less than said first share amount.

5. The method of any of claims 1-3, wherein the step of matching said buy order and said sell order includes the steps of:

determining if there is a second buy order with a second buy order price which is lower than said buy order price and above said midpoint;

calculating a cross point based on said second buy order price; and matching said buy order and said sell order at said cross point.

6. The method of claim 5, wherein said cross point is equal to said second buy order price.

7. The method of claim 5, wherein said cross point is equal to said second buy order price plus an increment.

8. The method of any of claims 1-3, wherein the step of matching said buy order and said sell order includes the steps of:

determining if there is a second sell order with a second sell order price which is higher than said sell order price and below said midpoint;

calculating a cross point based on said second sell order price; and matching said buy order and said sell order at said cross point.

9. The method of claim 8, wherein said cross point is equal to said second sell order price.

10. The method of claim 8, wherein said cross point is equal to said second sell order price minus an increment.

11. The method of any of claims 1-3, wherein said buy order is selected from a plurality of buy orders each having a buy order price and wherein said buy order price of said selected buy order has the highest buy order price among said plurality of buy orders.

12. The method of any of claims 1-3, further comprising the step of:

selecting with one of said computer processors said buy order, wherein said buy order is an agency buy order ahead of a second buy order having a second buy order price equal to said buy order price of said buy order wherein said second buy order is a proprietary order.

13. The method of any of claims 1-3, further comprising the step of:

selecting with one of said computer processors said buy order ahead of a second buy order having a second buy order price equal to said buy order price of said buy order, wherein said buy order is an agency order having an order time and wherein said second buy order is an agency order having a second order time and wherein said order time is prior to said second order time.

14. The method of any of claims 1-3, further comprising the step of:

selecting with one of said computer processors said buy order ahead of a second buy order having a second buy order price equal to said buy order price of said buy order, wherein said buy order is a proprietary order having an order time and wherein said second buy order is a proprietary order having a second order time and wherein said order time is prior to said second order time.

15. The method of any of claims 1-3, further comprising the steps of:

receiving through a crossing network a plurality of pass-through orders and a plurality of passive orders, wherein said passive orders include at least one order selected from the group consisting of: not held designated orders, cross only designated orders and do no represent designated orders; and attempting to match said buy order and said sell order within said crossing network.

16. The method of claim 15, wherein said buy order and said sell order are included in said plurality of pass-through orders.

17. The method of claim 15, wherein said buy order and said sell order are included in said plurality of passive orders.

18. The method of claim 15, wherein one of said buy order and said sell order is included in said pass-through orders and one of said buy order and said sell order is included in said passive orders.

19. The method of claim 15, wherein said passive orders are blind orders.

20. The method of claim 15, further comprising the step of:

receiving through an order router in communication with said crossing network and in communication with at least one external order destination at least a portion of said pass-through orders from said crossing network; and forwarding through said order router said at least a portion of said pass-through orders to said at least one external order destination.

21. The method of claim 20, wherein said at least a portion of said pass-through orders includes orders that have not been matched by said crossing network.

22. The method of claim 20, wherein a portion of said pass-through orders are forwarded to said at least one external destination after a time delay.

23. The method of any of claims 1-3, wherein the step of identifying an NBBO price range includes the step of:

receiving an updated NBBO.

24. The method of any of claims 1-3, wherein said identifying step comprises receiving said NBBO.

25. A computer-implemented system for matching a buy order having a buy order price and a sell order having a sell order price, comprising:

at least one input device for receiving at least said buy order and said sell order; and at least one computer processor adapted to:

identify an NBBO price range, said NBBO price range having a best offer price and a best bid price;

determine if said buy order price and said sell order price are within said NBBO price range;

determine if said buy order price is not less than said sell order price;

wherein when said buy order price is not within said NBBO price range and said sell order price is within said NBBO price range, said at least one computer processor is further adapted to:

change said buy order price to a changed buy order price that is equal to said best offer price;

calculate a midpoint between said changed buy order price and said sell order price; and match said buy order and said sell order at said midpoint;

wherein said at least one computer processor is operatively connected to said at least one input device to receive said buy order and said sell order.

26. A computer-implemented system for matching a buy order having a buy order price and a sell order having a sell order price, comprising:

at least one input device for receiving at least said buy order and said sell order; and at least one computer processor adapted to:

identify an NBBO price range, said NBBO price range having a best offer price and a best bid price;

determine if said buy order price and said sell order price are within said NBBO price range;

determine if said buy order price is not less than said sell order price;

wherein when said sell order price is not within said NBBO price range and said buy order price is within said NBBO price range, said at least one computer processor is further adapted to:
 change said sell order price to a changed sell order price that is equal to said best bid price;
 calculate a midpoint between said changed sell order price and said buy order price; and
 match said buy order and said sell order at said midpoint;
wherein said at least one computer processor is operatively connected to said at least one input device to receive said buy order and said sell order.

27. A computer-implemented system for matching a buy order having a buy order price and a sell order having a sell order price, comprising:
 at least one input device for receiving at least said buy order and said sell order; and
 at least one computer processor adapted to:
  identify an NBBO price range, said NBBO price range having a best offer price and a best bid price;
  determine if said buy order price and said sell order price are within said NBBO price range;
  determine if said buy order price is not less than said sell order price;
wherein when said buy order price and said sell order price are not within said NBBO price range, said at least one computer processor is further adapted to:
 change said buy order price to a changed buy order price that is equal to said best offer price;
 change said sell order price to a changed sell order price that is equal to said best bid price;
 calculate a midpoint between said changed buy order price and said changed sell order price; and
 match said buy order and said sell order at said midpoint;
wherein said at least one computer processor is operatively connected to said at least one input device to receive said buy order and said sell order.

28. The system of any of claims 25-27, wherein said processor is further adapted to receiving said NBBO.

29. A computer readable storage on a tangible medium storing instructions for matching a buy order having a buy order price and a sell order having a sell order price that, when executed by at least one computer processor, cause the at least one computer processor to:
 identify an NBBO price range, said NBBO price range having a best offer price and a best bid price;
 determine if said buy order price and said sell order price are within said NBBO price range;
 determine if said buy order price is not less than said sell order price;
wherein when said buy order price is not within said NBBO price range and said sell order price is within said NBBO price range, said instructions further cause the at least one computer to:
 change said buy order price to a changed buy order price that is equal to said best offer price;
 calculate a midpoint between said changed buy order price and said sell order price; and
 match said buy order and said sell order at said midpoint.

30. A computer readable storage on a tangible medium storing instructions for matching a buy order having a buy order price and a sell order having a sell order price that, when executed by at least one computer processor, cause the at least one computer processor to:
 identify an NBBO price range, said NBBO price range having a best offer price and a best bid price;
 determine if said buy order price and said sell order price are within said NBBO price range;
 determine if said buy order price is not less than said sell order price;
wherein when said sell order price is not within said NBBO price range and said buy order price is within said NBBO price range, said instructions further cause the at least one computer to:
 change said sell order price to a changed sell order price that is equal to said best bid price;
 calculate a midpoint between said changed sell order price and said buy order price; and
 match said buy order and said sell order at said midpoint.

31. A computer readable storage on a tangible medium storing instructions for matching a buy order having a buy order price and a sell order having a sell order price that, when executed by at least one computer processor, cause the at least one computer processor to:
 identify an NBBO price range, said NBBO price range having a best offer price and a best bid price;
 determine if said buy order price and said sell order price are within said NBBO price range;
 determine if said buy order price is not less than said sell order price;
wherein when said buy order price and said sell order price are not within said NBBO price range, said instructions further cause the at least one computer to:
 change said buy order price to a changed buy order price that is equal to said best offer price;
 change said sell order price to a changed sell order price that is equal to said best bid price;
 calculate a midpoint between said changed buy order price and said changed sell order price; and match said buy order and said sell order at said midpoint.

* * * * *